(12) United States Patent
Ludorf

(10) Patent No.: US 9,300,215 B2
(45) Date of Patent: Mar. 29, 2016

(54) DIMMABLE LED POWER SUPPLY WITH POWER FACTOR CONTROL

(71) Applicant: Infineon Technologies Austria AG, Villach (AT)

(72) Inventor: Werner Ludorf, Ruhpolding (DE)

(73) Assignee: Infineon Technologies Austria AG, Villach (AT)

( * ) Notice: Subject to any disclaimer, the term of this patent is extended or adjusted under 35 U.S.C. 154(b) by 132 days.

(21) Appl. No.: 14/252,337

(22) Filed: Apr. 14, 2014

(65) Prior Publication Data

US 2014/0226370 A1 Aug. 14, 2014

Related U.S. Application Data

(63) Continuation of application No. 12/771,478, filed on Apr. 30, 2010, now Pat. No. 8,698,421.

(51) Int. Cl.
| | |
|---|---|
| *G05F 1/00* | (2006.01) |
| *H02M 3/335* | (2006.01) |
| *H02M 1/42* | (2007.01) |
| *H05B 33/08* | (2006.01) |

(52) U.S. Cl.
CPC ........ *H02M 3/33507* (2013.01); *H02M 1/4258* (2013.01); *H05B 33/0815* (2013.01); *Y02B 70/126* (2013.01)

(58) Field of Classification Search
USPC ............. 315/177, 209 R, 307, 291, 294, 297, 315/299, 300, 302, 308, 311, 219, 224, 254, 315/276, 282, 200 R, 206, 362
See application file for complete search history.

(56) References Cited

U.S. PATENT DOCUMENTS

| | | |
|---|---|---|
| 6,304,464 B1 | 10/2001 | Jacobs et al. |
| 6,586,890 B2 | 7/2003 | Min et al. |
| 6,707,283 B1 | 3/2004 | Ball |

(Continued)

FOREIGN PATENT DOCUMENTS

WO          0105193 A1      1/2001

OTHER PUBLICATIONS

"15 W Offline TRIAC Dimmable LED Driver", AN2711 Application Note, Apr. 2009, pp. 1-33, STMicroelectronics.

(Continued)

*Primary Examiner* — Douglas W Owens
*Assistant Examiner* — Jianzi Chen
(74) *Attorney, Agent, or Firm* — Slater & Matsil, L.L.P.

(57) ABSTRACT

A dimmable LED power supply circuit arrangement is disclosed. The circuit arrangement includes a flyback converter coupled between an input for receiving a rectified alternating line voltage and an output providing power for at least one LED device. The flyback converter includes a transformer and a semiconductor switch for switching a primary current of the transformer. A current sensing unit provides a current sense signal dependent on the primary current. A control unit controls the switching operation of the semiconductor switch dependent on the rectified alternating line voltage and the current sense signal such that the flyback converter operates in a quasi-resonant mode of operation, whereby the current sense signal is compared with a time-varying reference signal representing the rectified alternating line voltage and whereby a switch-off time of the semiconductor switch is determined dependent on the comparison.

23 Claims, 4 Drawing Sheets

(56) References Cited

U.S. PATENT DOCUMENTS

| | | |
|---|---|---|
| 7,102,902 B1 | 9/2006 | Brown et al. |
| 8,013,544 B2 | 9/2011 | Negrete et al. |
| 2004/0032752 A1 | 2/2004 | Kim et al. |
| 2007/0290625 A1 | 12/2007 | He et al. |
| 2008/0018261 A1 | 1/2008 | Kastner |
| 2008/0150450 A1 | 6/2008 | Starr et al. |
| 2008/0258647 A1 | 10/2008 | Scianna |
| 2009/0160369 A1 | 6/2009 | Godbole et al. |
| 2010/0213857 A1* | 8/2010 | Fan .................. H05B 33/0827 315/186 |
| 2010/0302816 A1 | 12/2010 | Hu et al. |

OTHER PUBLICATIONS

"A Fresh Approach to Switching Regulator Topologies and Implementations," Global Power Seminar 2006, pp. 1-34, Fairchild Semiconductor.

"AC/DC Digital Current-Mode Cotroller for LED Lighting," CY8CLEDAC01, Mar. 29, 2010, pp. 1-14, Cypress Semiconductor Corporation.

"AC/DC Digital Power Controller for Dimmable LED Drivers", iW3610 Product Brief, Mar. 29, 2010, pp. 1-5, iWatt, Inc.

"Design Guidelines for Quasi-Resonant Converters Using FSCQ-series Fairchild Power Switch (FPS)," Application Note AN4146, Rev. 1.0.1, Sep. 20, 2005, pp. 1-24, Fairchild Semiconductor.

"Green Mode Fairchild Power Switch (FPS)," FSCQ-Series: FSCQ0565RT/FSCQ0765RT/FSCQ0965RT/FSCQ1265RT/FSCQ1465RT/FSCQ1565RT/FSCQ1565RP, Rev. 1.1.2, Feb. 2006, pp. 1-45, Fairchild Semiconductor.

"LM3445 Triac Dimmable Offline LED Driver", Feb. 19, 2010, pp. 1-26, National Semiconductor Corporation.

"SSL2101 Dimmable High Efficiency Flyback Design", AN10829 Application Note, Oct. 16, 2009, pp. 1-22, NXP Semiconductors.

* cited by examiner

DIMMABLE LED POWER SUPPLY WITH POWER FACTOR CONTROL

This is a continuation application of U.S. application Ser. No. 12/771,478, entitled "Dimmable LED Power Supply with Power Factor Control," which was filed on Apr. 30, 2010 and is incorporated herein by reference in its entirety.

TECHNICAL FIELD

The present disclosure relates to a switched mode power supply for efficiently driving LED devices including power factor control.

BACKGROUND

Since their commercial appearance in the 1960's, light emitting diodes (LED) have become ubiquitous in electronic devices. Traditionally, LED light output was ideal for indicator applications but insufficient for general illumination. However, in recent years a great advance in the development of high-intensity LEDs has occurred. These new LEDs operate at much higher current levels than their predecessors (350 milliamps to several amperes compared to the 10-50 milliamp range for traditional LEDs). These new power LEDs produce sufficient output to make them practical as sources of illumination.

Presently, the high cost of the new power LEDs renders them best suited for applications where the unique characteristics of LEDs (ruggedness, long life, etc.) compensate for the extra expense. However, the cost of these high power LEDs continues to fall while efficiency (luminous flux generated per unit of electrical power consumed) continues to rise. Predictions are that in the near future, LEDs will be the source for general illumination, preferred over incandescent, florescent lamps or the like.

LEDs are a type of semiconductor device requiring direct current (DC) for operation. For optimum light output and reliability, that direct current should have a low ripple content. Since the electrical power grid delivers alternating current (AC), a line-powered device must convert the AC to DC in order to power the LEDs.

Further, LEDs are current driven rather than voltage driven devices. The driving circuit usually regulates the current more precisely than the voltage supplied to the device terminals. The current regulation requirement imposes special considerations in the design of LED power supplies since most power supplies are designed to regulate output voltage. Indeed, the design of the majority of integrated circuits (IC) commercially available for controlling power supplies is for voltage regulation.

Another increasingly common requirement for line-operated equipment is power factor correction (PFC also power factor control). PFC devices maximize the efficiency of the power grid by making the load "seen" by the power grid "look" (approximately) resistive thus minimizing the reactive power. The efficiency of resistive loads arises from the unvarying proportionality of the instantaneous voltage to the instantaneous current at any point on the AC sinusoidal voltage waveform. Typically a power factor of over 90 per cent is required or at least desirable.

For safety, it is desirable for the output of the power circuit (connected to the LEDs) to include galvanic isolation from the input circuit (connected to the utility power grid). The isolation averts possible current draw from the input source in the event of a short circuit on the output and should be a design requirement.

Another design requirement is for the conversion from the incoming AC line power to the regulated DC output current to be accomplished through a single conversion step controlled by one switching power semiconductor. A one-step conversion maximizes circuit efficiency, reduces cost, and raises overall reliability. Switching power conversion in the circuit design is necessary but not sufficient to satisfy the one-step conversion requirement while capitalizing on the inherent efficiency.

For increased versatility, the LED driver circuit should allow dimming the LEDs' light output. It is especially desirable to operate the LED power supply in connection with phase control dimmers (phase cutting dimmer) which are already widely used to regulate the brightness of incandescent and fluorescent lamps.

There is a need for a LED power supply that exhibits an electric behavior as an incandescent lamp. Further the power supply should require a low number of components for easy integration in so-called LED-bulbs that can fully replace present incandescent lamps.

SUMMARY OF THE INVENTION

A dimmable LED power supply circuit arrangement is disclosed. The circuit arrangement includes: a flyback converter coupled between an input for receiving a rectified alternating line voltage and an output providing power for at least one LED device. The flyback converter includes a transformer and a semiconductor switch for switching a primary current of the transformer. A current sensing unit provides a current sense signal dependent on the primary current. A control unit controls the switching operation of the semiconductor switch dependent on the rectified alternating line voltage and the current sense signal such that the flyback converter operates in a quasi-resonant mode of operation, whereby the current sense signal is compared with a time-varying reference signal representing the rectified alternating line voltage and whereby a switch-off instant of the semiconductor switch is determined dependent on the comparison.

BRIEF DESCRIPTION OF THE DRAWINGS

The invention can be better understood with reference to the following drawings and description. The components in the figures are not necessarily to scale, instead emphasis being placed upon illustrating the principles of the invention. Moreover, in the figures, like reference numerals designate corresponding parts. In the drawings:

FIG. 2, illustrate the example of FIG. 1 in more detail;

FIG. 4, illustrate the waveforms of the rectified AC input voltage and the primary current of the flyback converter for various conditions;

DETAILED DESCRIPTION OF ILLUSTRATIVE EMBODIMENTS

Figure 1:
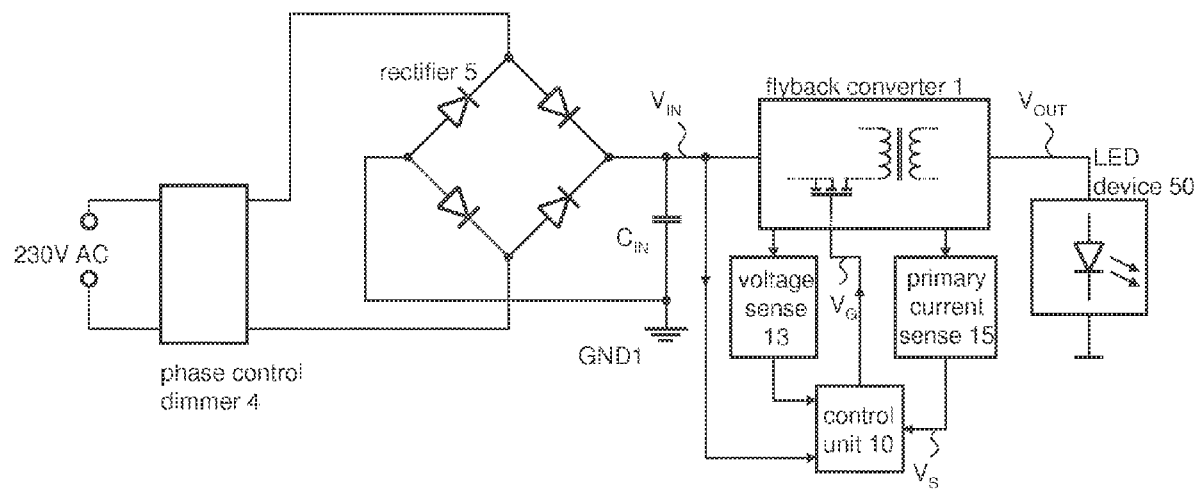
FIG. 1 illustrates the basic structure of a dimmable LED power supply circuit arrangement including active power factor correction.

FIG. 1 illustrates the basic structure of a dimmable LED power supply circuit arrangement in accordance to one example of the present invention. The circuit arrangement comprises a flyback converter 1 which, includes a primary side and a secondary side which are galvanically isolated by a transformer, having a primary winding $L_P$ and a secondary winding $L_S$ (see also FIG. 2).

The primary winding $L_P$ of a flyback converter 1 is coupled to a rectifier 5 configured to rectify an alternating line voltage supplied by, for example, the power grid, whereby the line voltage may be subject to phasecut dimming.

The secondary winding $L_S$ of the flyback converter 1 is coupled to a load, i.e. the LED device 50, for supplying output power thereto. The flyback converter 1 further includes a power semiconductor switch $T_1$ for controlling the current flow through the primary winding $L_P$ (denoted as primary current $i_P$). That is, the semiconductor switch is configured to switch the primary current $i_P$ on and off in accordance with a respective control signal. The circuit arrangement further includes a current sense unit 15 that provides a current sense signal $V_S$ representing the primary current $i_P$ through the primary winding $L_P$. The circuit arrangement further includes a control unit 10 that generates the control signal $V_G$ supplied to the semiconductor switch $T_1$.

Generally, control unit 10 controls the switching operation of the flyback converter 1. In the present example the control unit 10 is configured to control the flyback converter such that it operates in a quasi-resonant (i.e., self-oscillating) mode. The control unit 10 is further configured to compare the current sense signal with a reference signal that represents the (time-varying) rectified input line voltage $Y_{IN}$ which typically includes a full-wave rectified sine waveform. The control signal $V_G$ controlling the switching state of the semiconductor switch $T_1$ is set to switch the primary current $i_P$ off when the primary current sense signal $V_S$ equals or exceeds the reference signal representing the rectified input line voltage $V_{IN}$. In quasi-resonant mode the semiconductor switch $T_S$ is, for example, switched on when the voltage across the switch is at a minimum. For this purpose the circuit arrangement may include a voltage sense unit 13 for direct or indirect monitoring the voltage drop across the semiconductor switch during the off-time of the switch in order to allow for detecting the time instant when the voltage is at a minimum. Thus, the switching losses and the electromagnetic emissions are minimized.

Figure 2A:
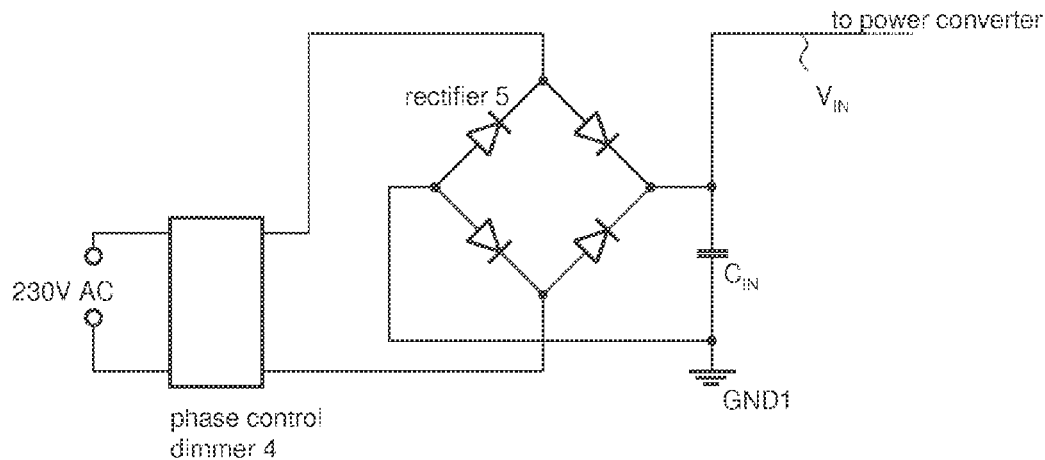
FIGS. 2a and 2b, collectively
Figure 2B:
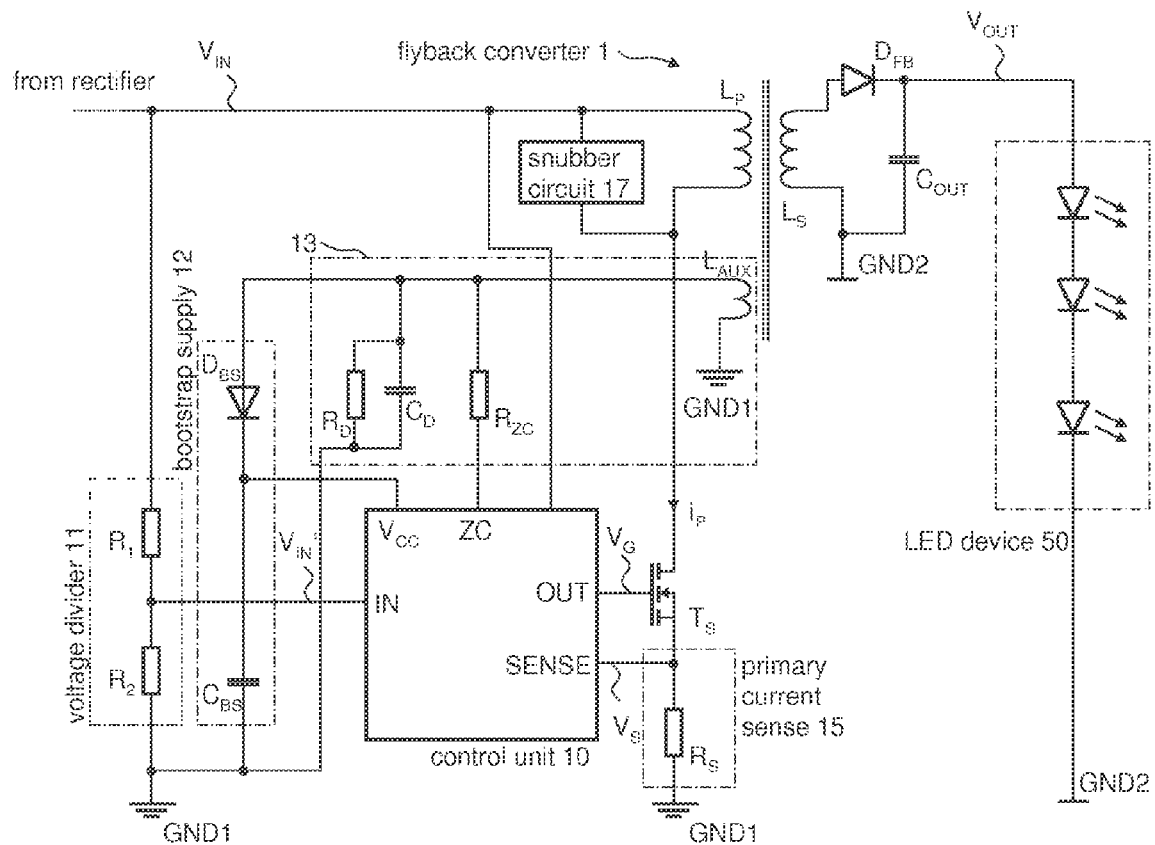

FIG. 2 illustrates one exemplary implementation of the basic structure of FIG. 1 in more detail. The LED device 50 may include several light emitting diodes connected in series such that the overall forward voltage of the LED device is between about 15 and 30 volts which has to be provided as output voltage $V_{OUT}$ by the flyback converter 1. This output voltage is provided by buffer capacitor $C_{OUT}$ (output capacitor) which is coupled in parallel to a series circuit including the secondary winding $L_S$ of the transformer and the flyback diode $D_{FB}$. Energy is transferred from the primary side to the secondary side of the transformer in the time intervals during which the primary current $i_P$ is switched off. During the same time interval the buffer capacitor $C_{OUT}$ is charged via the flyback diode $D_{FB}$ by the induced current flowing through the secondary winding $L_S$.

The primary winding $L_P$ is connected between an output of the rectifier 5 that provides the rectified input line voltage $V_{IN}$ and the semiconductor switch $T_S$ which controls the current flow (primary current $i_P$) through the primary winding L. In the present example, the semiconductor switch $T_S$ is a MOSFET coupled between the primary winding $L_P$ and the ground terminal providing ground potential GND1. A current sense resistor $R_S$ may be connected between the source terminal of the MOSFET $T_S$ and the ground terminal such that the voltage drops $V_S$ across the current sense resistor $R_S$ represents the primary current $i_P$. It should be noted, that the current sense resistor $R_S$ is just one exemplary implementation of the current sense unit 15 illustrated in FIG. 1. Any other known current measurement method and related circuits are applicable as well. The voltage drop $V_S$ across the current sense resistor $R_S$ is provided as a current sense signal to the control unit 10 which generates a gate signal $V_G$ supplied to the control terminal of the semiconductor switch for controlling the switching state thereof.

When the semiconductor switch $T_S$ is switched on, the primary current $i_P$ starts to rise and the energy $E_P$ stored in the primary winding $L_P$ increases. Since the flyback diode $D_{FB}$ is reverse biased during this phase of "charging" the inductance of the primary winding $L_P$, the primary winding $L_P$ behaves like a singular inductor and the energy $E_P$ stored in the primary winding equals $E_P = L_P \cdot i_P^2/2$. When the primary current $i_P$ is switched off by the semiconductor switch $T_S$ the flyback diode $D_{FB}$ becomes forward biased and energy is transferred to the secondary winding $L_S$, whereby the secondary current induced in the secondary winding $L_S$ charges the output capacitor $C_{OUT}$. The operating principle of the control unit 10 according to which the switching times of the semiconductor switch $T_S$ are determined is explained later with reference to FIG. 3.

A snubber circuit 17 is connected in parallel to the primary winding $L_P$ for damping voltage peaks and oscillations. Typically such snubber circuits include a freewheeling diode connected in series to a resistor-capacitor parallel circuit. However, such circuits are well known in the art and will not be further discussed for the sake of brevity.

A fractional part of the rectified input line voltage $Y_{IN}$ is provided to the control circuit 10 via a voltage divider 11 formed by resistors $R_1$ and $R_2$ coupled in series between the output terminal of the rectifier 5 and the ground terminals GND1. The middle tap of the voltage divider is connected to the control unit 10 providing a fractional part $V_{IN}' = V_{IN} \cdot R_2/(R_1 + R_2)$ of the rectified input line voltage $Y_{IN}$ thereto.

For detecting the optimal time for switching on the primary current an auxiliary winding $L_{AUX}$ may be magnetically coupled to the primary winding L. A first terminal of the auxiliary winding $L_{AUX}$ is coupled to the ground terminal GND 1 whereas a second terminal of the auxiliary winding $L_{AUX}$ is coupled to the control unit 10 via a resistor $R_{ZC}$. Resistor $R_{ZC}$ forms, together with the auxiliary winding $L_{AUX}$, the voltage sense circuit 13 illustrated in FIG. 1 for detecting a minimum voltage across the semiconductor switch $T_S$ in order to find an optimal switching instant. A resistor-capacitor parallel circuit $R_D$, $C_D$ may be coupled in parallel to the auxiliary winding. The voltage minimum to detect may be thus time-shifted dependent on the time constant of the parallel circuit $R_D$, $C_D$.

The auxiliary winding $L_{AUX}$ may further be used for providing a supply voltage $V_{CC}$ to the control unit 10 by means of a bootstrap supply circuit 12. When the primary current $i_P$ is switched off, the voltage across the auxiliary winding $L_{AUX}$ rises such that the bootstrap diode $D_{BS}$ is forward-biased and thus allows for charging the bootstrap capacitor $C_{BS}$. However, such bootstrap supply circuit is well known in present flyback converters and will not be further discussed here.

Figure 3:
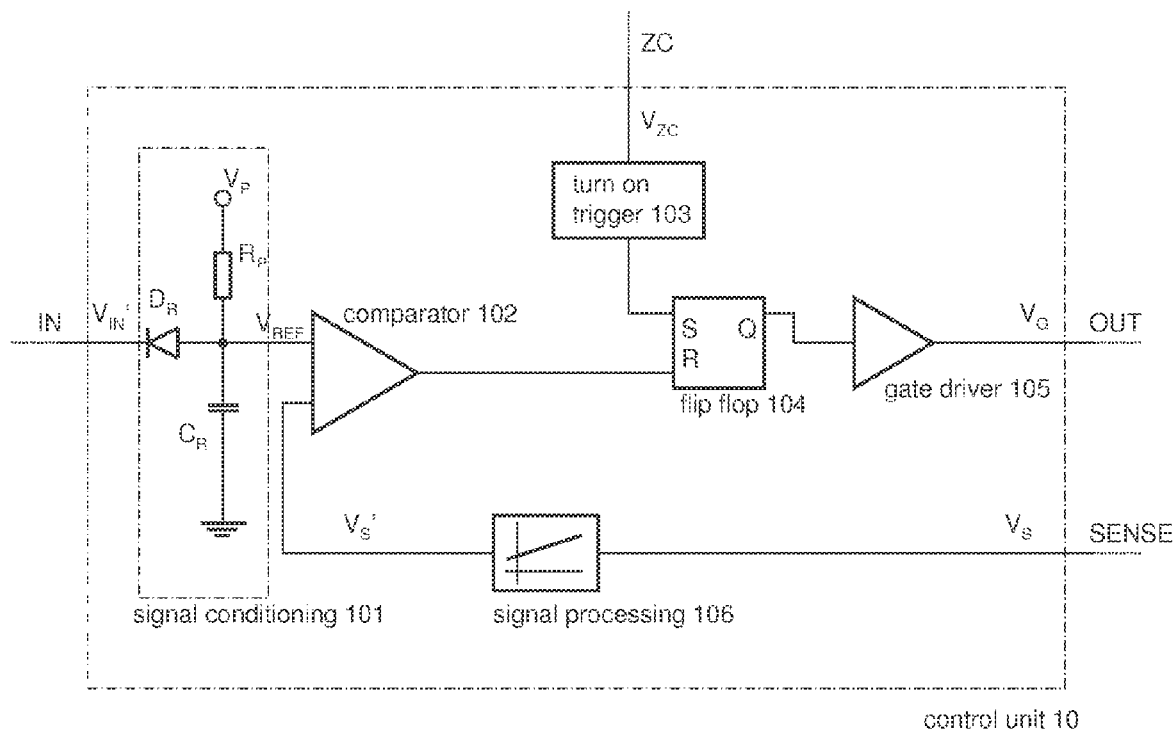
FIG. 3 illustrates the control unit of the examples of FIGS. 1 and 2 in more detail.

FIG. 3 illustrates an exemplary implementation of the control unit 10. Further the function of the control unit will be discussed below with reference to FIGS. 3 and 4.

The control unit 10 includes a gate driver circuit 105 that provides a driver signal (in the present example gate voltage $V_G$) for controlling the conduction state (on and off) of the semiconductor switch $T_1$. The output of the gate driver circuit denoted with the reference symbol OUT. The input of the gate driver is connected to the output Q of a flip-flop 104 such that the state of the flip-flop output signal determines the current flow of the primary current $i_P$. In the present example the flip-flop 104 is a RS-flip-flop with a "set" input S and a "reset" input R. Thus, an appropriate trigger signal supplied to the input S turns the semiconductor switch $T_1$ on, whereas an appropriate trigger signal supplied to the reset input R switches the semiconductor switch $T_1$ off.

The reset input of the flip-flop 104 is connected with the output of a comparator 102 which is configured to compare a processed current sense signal $V_S'$ representing the primary current $i_P$ with a reference signal $V_{REF}$ representing the time-variant rectified line voltage $Y_{IN}$. The current sense signal $V_S'$ stems from the current sense unit 15, e.g., the sense resistor $R_S$, and is pre-processed by the signal processing unit 106 which processes the original current sense signal $V_S$ in accordance with pre-defined characteristic curve. The function of the signal processing unit 106 is discussed in more detail below with reference to FIG. 5.

The time-variant reference signal $V_{REF}$ may be equal to the fractional portion $V_{IN}'$ of the (rectified) input line voltage $Y_{IN}$ and may be optionally subject to a signal conditioning performed by the signal conditioning unit 101. In the present example, the fractional portion $V_{IN}'$ of the rectified input line voltage $Y_{IN}$ is supplied to the comparator input of comparator 102 via a diode $D_R$ whereby the cathode of the diode $D_R$ is connected to the comparator input which is further coupled to a pull up potential $V_P$ via a pull up resistor $R_P$ and coupled to ground potential GND1 via a capacitor $C_R$. However, the shape of the input voltage $V_{IN}'$ may be adjusted or modified by the signal conditioning unit 101. In the present example the signal conditioning unit 101 prevents the time-variant reference signal to fall a threshold value that corresponds to the forward voltage of the diode $D_R$. This prevents the primary current to actually remain zero for a longer time in order to stabilize the self-oscillating flyback converter circuit. However, as already mentioned, the signal conditioning unit 101 is optional dependent on the actual implementation of the control circuit.

Further, together with the signal processing unit 106, the signal conditioning unit 101 can influence the dimming behavior of the circuit arrangement in case a phase control dimmer 4 is active between the AC input and the rectifier (see FIG. 1 or 2), in particular the brightness range in which the brightness of the LED device 50 may be adjusted can be influenced by the signal conditioning 101 or signal processing 106.

Figure 4A:
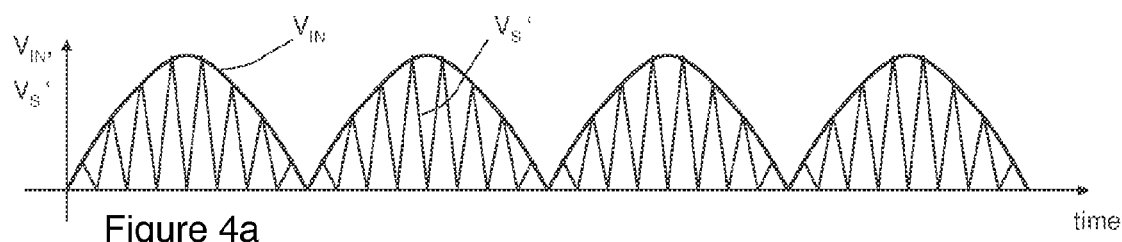
FIGS. 4a-4c, collectively
Figure 4B:
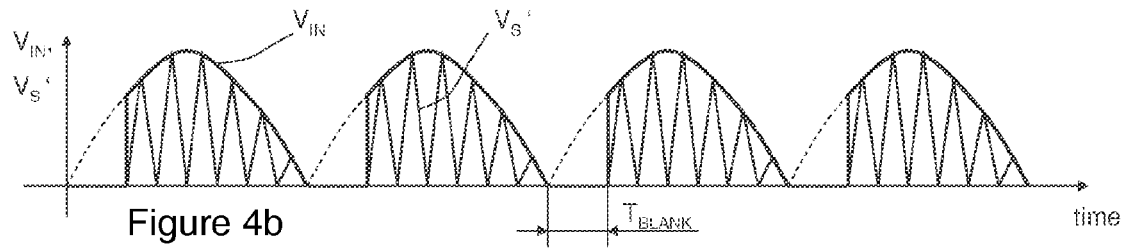
Figure 4C:
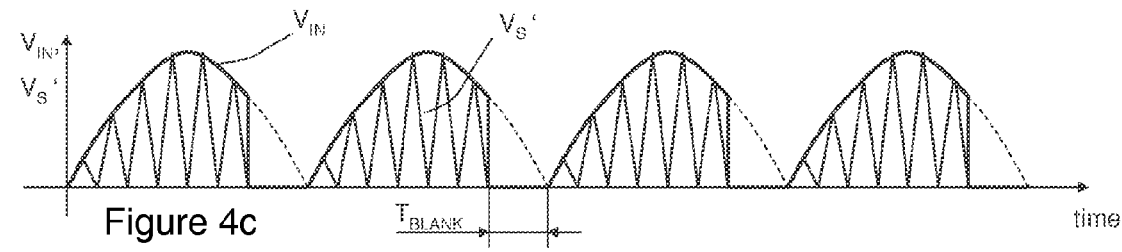

The function of the control unit illustrated in FIG. 3 employed in the circuit arrangement of FIG. 2 is explained below with reference to FIG. 4. The top timing diagram (diagram a) of FIG. 4 illustrates a full-wave rectified sine waveform and the current sense signal $V_S$ representing the primary current $i_P$. Since the flyback converter 1 operates in the quasi-resonant mode, the semiconductor switch $T_1$ is turned on when the voltage drop across the semiconductor switch $T_1$ reaches a minimum. This is detected by the voltage sense unit 13 coupled to input ZC of the control unit 10 and by the turn on trigger circuit 103 receiving the voltage signal $V_{ZC}$ from the voltage sense circuit 13 providing a trigger signal to the set input of the flip-flop 104. When the semiconductor switch is opened, the primary current $i_P$ starts to rise as illustrated in the top diagram of FIG. 4. As soon as the current sense signal $V_S'$ reaches the reference signal $V_{REF}$ representing the full-wave rectified sign waveform of the interline voltage, the comparator 102 triggers the switch-off of the semiconductor switch $T_1$ which causes the primary current to fall to zero. After the voltage sensed by the voltage sense circuit 13 by means of the auxiliary winding $L_{AUX}$ has, again, reached the minimum, the semiconductor switch $T_1$ is closed again and the cycle starts over. Since the reference signal $V_{REF}$ which the current sense signal $V_S'$ is compared to is time-variant and follows the full-wave rectified waveform of the input line voltage, the average input current drawn from the power grid by the present circuit arrangement approximately has the same waveform as the input line voltage which results in a high power factor up to over 99 per cent.

In order to provide the above-mentioned power factor correction (PFC) function the control unit that controls the driving of the semiconductor switch has to ensure that a short-term average of the primary current follows the waveform of the rectified line input voltage. For this reason a smoothing capacitor for smoothing the rectified line voltage should not be coupled to the primary side of the flyback converter. Further, the energy needed for reducing the LED current modulation to a not visible degree has to be stored in the output capacitor $C_{OUT}$. As can be seen from FIGS. 2 and 3, only a single power semiconductor switch is required for providing the power conversion function (also when phase cut dimming is active) as well as the function of power factor correction. This fact is a result of the switching control as explained above.

This relation between input line voltage and current consumption remains also valid if the input line voltage is subject to phase control dimming as illustrated in the middle timing diagram of FIG. 4 (diagram b) where the input line voltage $Y_{IN}$ is subject to leading edge phase-cut dimming. In the time interval $T_{BLANK}$ during which the input line voltage is zero and thus, the time-variant reference voltage $V_{REF}$ is also zero and, as a result, the semiconductor remains in an off-state. As can be seen from the bottom diagram of FIG. 4 the current consumption of the LED power supply circuit arrangement follows the (dimmed) waveform of the line input voltage $Y_{IN}$ even when subject to phase-cut dimming resulting in a non-reactive input behavior of the circuit arrangement and high power factors over 99 percent. However, it is not required that the input current remains exactly zero during the interval $T_{BLANK}$ as long as the mean current drawn from the circuit remains sufficiently low compared to the peak current values. The bottom diagram of FIG. 4 (diagram c) illustrates the same situation as the middle diagram (diagram b) with the only difference that trailing-edge phase cut dimming is used instead of leading-edge dimming.

Thus, the switching control implemented by the control unit 10 not only guarantees a high power factor but also a thermally stable power supply for connected LED illumination devices 50. The amount of energy stored in the inductance provided by the primary windings $L_P$ in each switching cycle equals $P(t)=L_P \cdot i_{Pmax}^2(t)/2$, whereby $i_{Pmax}(t)$ is the peak value of the primary current which is time variant in accordance to a full-wave rectified sine waveform as illustrated in FIG. 4. Thus, the mean power consumption P equals $P=L_P \cdot i_{Pmax}^2 \cdot f_{QR}/2$, whereby $f_{QR}$ equals the quasi-resonant switching frequency of the flyback converter 1. Consequently the period of a switching cycle results in $T_{QR}=1/f_{QR}$.

A fraction of the switching period, namely the flyback time $t_F$ during which energy is transferred to the output capacitor $T_{OUT}$, calculates as follows:

$$t_F = L_P \cdot i_{Pmax}/(V_{OUT} N_P/N_S),$$

whereby the ratio $N_P/N_S$ denotes the winding ratio of the primary winding $L_P$ and the secondary winding $L_S$. The output voltage $V_{OUT}$ is essentially determined by the forward voltage of the LED device 50 as already mentioned above.

Thus, in case of a thermally induced reduction of the forward voltage (as a result of an increased temperature) the flyback time will increase resulting in a lower quasi-resonant switching frequency $f_{QR}$. In turn, the lower switching frequency $f_{QR}$ entails a lower power consumption so that, as a result, a rising temperature is followed by a reduction of the power provided by the flyback converter which allows the LED device 50 to cool down. The switching control of the control unit 10 thus provides a thermally stable switching operation of the LED power supply circuit arrangement without the need for a current control of the load current through the LED device 50. The present LED power supply circuit arrangement renounces the former practice of current controlled LED driving.

Figure 5:
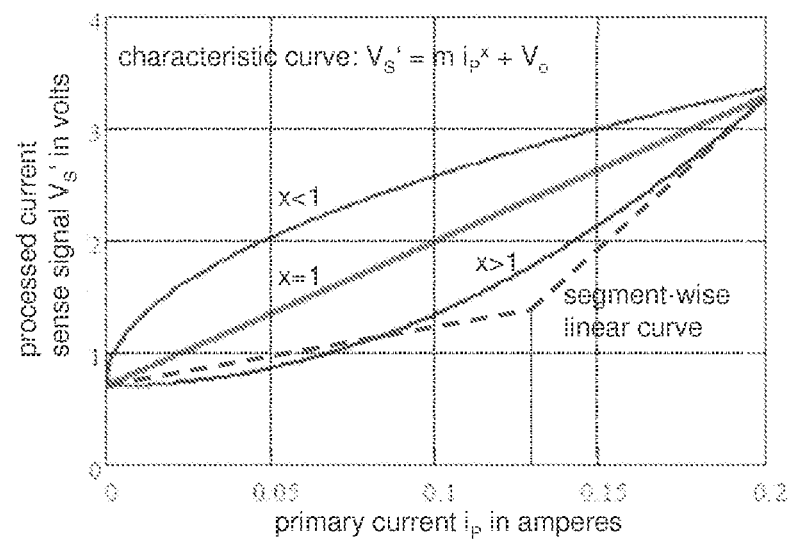
FIG. 5 illustrates a characteristic curve used for processing the current sense signal representing the primary current.

FIG. 5 illustrates examples of the characteristic curves used by the signal processing unit 106 which forms a part of the control unit 10 illustrated in FIG. 3. In accordance with a first example, the characteristic curve includes only a linear gain, i.e., $V_S'=m \cdot V_S$, whereby m is the linear gain factor. Further, the characteristic curve may comprise an additional offset $V_O$, i.e., $V_S'=m \cdot V_S+V_O$. The value of the offset $V_O$ may be chosen such that it essentially compensates for the voltage drop across the signal conditioning unit 101 (e.g., across the diode $D_R$). However, the characteristic curve may generally be chosen to include an exponential characteristic, that is:

$$V_S'=m \cdot V_X^x+V_O, \qquad (1)$$

whereby m is a linear gain factor and exponent x may be chosen equal to, lower than, or greater than one. In the example of FIG. 5 three different characteristic curves are illustrated whereby in accordance to one case (top curve) the exponent x equals 0.5, in accordance to the second case (middle curve) the exponent x equals 1 (linear gain), and in the third case the exponent x equals 2 (quadratic gain). Further, characteristic curves may be used which have different (e.g., linear) gains in different segments. If the control unit is digitally implemented, for example, with the help of a signal processor or a micro controller, the characteristic curve may also be stored as a look-up table. Generally, the characteristic curve can be described as a non-linear, especially current dependent, gain.

Figure 6:
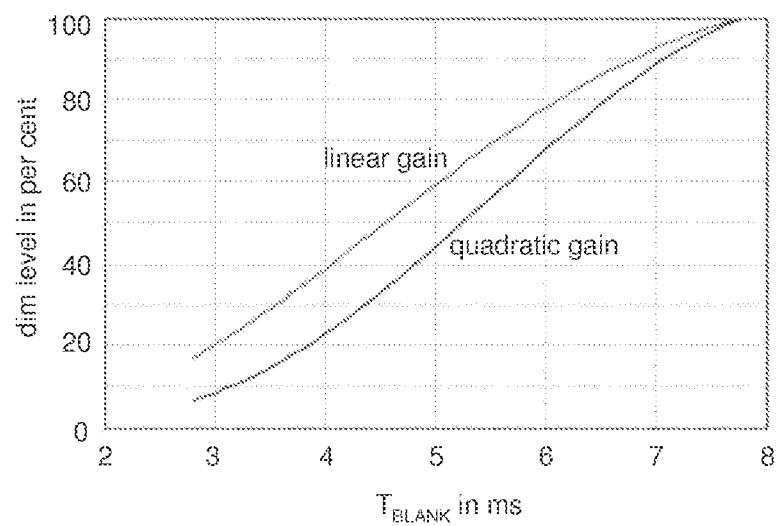
FIG. 6 illustrates the effect of the characteristic curves shown in FIG. 5 on the range wherein the dim level can be adjusted.

By choosing an appropriate characteristic curve for the signal processing unit 106 the range wherein the dim level can be adjusted when varying the switch-on or switch-off angle of the phase-cut dimmer within a pre-defined interval can be optimized. This effect is shown illustrated in FIG. 6.

Analysis of the circuit shows that, assuming a characteristic curve in accordance to equation (1), the power converted by the flyback converter of the present LED power supply circuit arrangement depends on the gain factor m as well as the offset value $V_O$. In order to guarantee a desired maximum tolerance of the output power provided to a LED device connected to the circuit arrangement a corresponding tolerance of the values m and $V_O$ has to be guaranteed by IC design or ensured during production test. When choosing a digital implementation of the control unit 10, appropriate digital values could be written to a non-volatile memory of the control unit at the end of the production process during a test procedure.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

What is claimed is:

1. A power supply circuit comprising:
a control unit configured to be coupled to a semiconductor switch connected to a primary winding of a transformer, wherein the control unit is configured to
control a switching operation of the semiconductor switch dependent on a rectified alternating line voltage and a current sense signal dependent on a current of the primary winding of the transformer,
compare the current sense signal with a time-varying reference signal representing the rectified alternating line voltage,
determine a switch-off instant of the semiconductor switch dependent on the comparing the current sense signal with the time-varying reference signal, and
drive the semiconductor switch such that a short-term average of the current of the primary winding follows the rectified alternating line voltage to provide a power factor correction.

2. The power supply circuit of claim 1, wherein the power supply circuit comprises a flyback converter.

3. The power supply circuit of claim 1, wherein the control unit comprises:
a signal conditioning circuit configured to receive a fraction of the rectified alternating line voltage and to provide the time-varying reference signal; and
a comparator coupled to receive the time-varying reference signal, wherein the comparator is configured to trigger the switch-off instant of the semiconductor switch if the current sense signal exceeds the time-varying reference signal.

4. The power supply circuit of claim 3, wherein the control unit further comprises:
a current sensing unit configured to provide the current sense signal dependent on the current of the primary winding of the transformer; and
a sense signal processing unit coupled between the comparator and the current sensing unit, wherein the sense signal processing unit is configured to transform the current sense signal in accordance with a pre-defined characteristic curve.

5. The power supply circuit of claim 4, wherein the pre-defined characteristic curve comprises a linear gain.

6. The power supply circuit of claim 5, wherein the pre-defined characteristic curve comprises an offset and a linear gain.

7. The power supply circuit of claim 6, wherein the pre-defined characteristic curve comprises a first segment comprising a first range of current sense values having a first gain and a second segment comprising a second range of current sense values having a second gain, wherein the first gain is different from the second gain.

8. The power supply circuit of claim 4, wherein the pre-defined characteristic curve comprises a non-linear gain, the non-linear gain being dependent on the current of the primary winding.

9. The power supply circuit of claim 4, wherein the pre-defined characteristic curve follows:

$$V_S'=m \cdot V_S^x+V_O,$$

wherein $V_S$ is the current sense signal, $V_S'$ is a transformed current measurement signal, m is a gain factor, $V_o$ is an offset, and x is an exponent value different from unity.

10. The power supply circuit of claim 5, wherein the predefined characteristic curve comprises a first segment comprising a first range of current sense values having a first gain and a second segment comprising a second range of current sense values having a second gain, wherein the first gain is different from the second gain.

11. The power supply circuit of claim 1, wherein the control unit is configured to turn on the semiconductor switch when a voltage across the semiconductor switch is at a minimum voltage.

12. The power supply circuit of claim 1, further comprising a voltage sense circuit coupled to the semiconductor switch, wherein the voltage sense circuit is configured to output a switch voltage signal that is proportional to the voltage across the semiconductor switch.

13. The power supply circuit of claim 12, wherein voltage sense circuit comprises an auxiliary winding of the transformer.

14. A method of managing a power supply, the method comprising:
sensing a current signal of a primary current of a transformer;
determining a switching signal comprising comparing a prepared current signal based on the sensed current signal and a reference signal, wherein the reference signal represents a rectified alternating line voltage;
controlling the primary current of the transformer based on the switching signal;
conditioning the sensed current signal; and
processing the sensed current signal, wherein processing the sensed current signal comprises applying to the sensed current signal an equation:

$$V_S'=m \cdot V_S^x+V_o,$$

wherein $V_S$ is the sensed current signal, $V_S'$ is the processed sensed current signal, m is a gain factor, $V_o$ is an offset, and x is an exponent value.

15. The method of claim 14, wherein x is equal to 1.

16. The method of claim 14, wherein x is not equal to 1.

17. The method of claim 14, wherein determining the switching signal further comprises activating the switching signal when a voltage across a semiconductor switch coupled to a primary winding of the transformer is at a minimum voltage.

18. The method of claim 14, further comprising detecting a voltage across a semiconductor switch coupled to a primary winding of the transformer.

19. A circuit comprising:
an input node configured to receive a rectified alternating line voltage;
a switch configured to be coupled to a primary winding of a transformer that is coupled to the input node, wherein the switch is configured to control a current of the primary winding based on a driver signal;
a current sense unit configured to be coupled to the primary winding, wherein the current sense unit is configured to output a current sense signal proportional to the current of the primary winding; and
a control unit coupled to the current sense unit and the input node, the control unit comprising
a comparator having a first input, a second input, and an output, and
a signal processing unit operatively coupled between the current sense unit and the first input of the comparator, wherein the control unit is configured to output the driver signal based on the current sense signal, and wherein the control unit is configured to drive the switch coupled to the primary winding such that a short-term average of the current of the primary winding follows a rectified line voltage waveform so as to provide a power factor correction.

20. The circuit of claim 19, further comprising:
a voltage sense circuit coupled to the switch, wherein the voltage sense circuit is configured to output a switch voltage signal that is proportional to the voltage across the switch; and
a voltage divider configured to output a voltage input signal, wherein the voltage input signal is proportional to the voltage of the input node, wherein the signal processing unit is further configured to output the driver signal based on the switch voltage signal and the voltage input signal.

21. The circuit of claim 20, further comprising a bootstrap circuit configured to supply a supply voltage to the control unit.

22. The circuit of claim 20, wherein the control unit further comprises a signal conditioning unit coupled between the second input of the comparator and the voltage divider.

23. The circuit of claim 22, wherein the control unit further comprises:
a flip flop having a first input, a second input, and an output, wherein the first input of the flip flop is coupled to the output of the comparator and the second input of the flip flop is coupled voltage sense circuit; and
a gate driver coupled to the output of the flip flop.

* * * * *